Patented Aug. 6, 1940

2,210,517

UNITED STATES PATENT OFFICE

2,210,517

PROCESS FOR THE PREPARATION OF ARYL-AMINOANTHRAQUINONE COMPOUNDS

Richard S. Wilder, Hamburg, N. Y., assignor to National Aniline & Chemical Company, Inc., New York, N. Y., a corporation of New York No Drawing. Application July 30, 1937, Serial No. 156,578

20 Claims. (Cl. 260—378)

The present invention relates to a process for the preparation of arylaminoanthraquinone compounds. More particularly it relates to a process for the preparation of arylaminoanthraquinone compounds in which an alpha-halogen substituted anthraquinone compound free from acid solubilizing groups is condensed with an arylamine likewise from such groups.

It is the principal object of the present invention to provide a process for the preparation of an arylaminoanthraquinone compound involving the condensation of an alphahalogen substituted anthraquinone compound with an arylamine when both the anthraquinone compound and the arylamine are free from acid solubilizing groups and their functional derivatives, which process is productive of the desired arylaminoanthraquinone compound in excellent yields and purity, and which may be practiced efficiently on a commercial scale.

Other objects of the invention will in part be obvious and will in part appear hereinafter.

For the preparation of arylaminoanthraquinone compounds, one of the most important of the general methods which have been employed is that involving the condensation of an alpha-halogen substituted anthraquinone compound with an arylamine. In carrying out condensations of this type, it is important that the reacting materials be brought together under such conditions that the replacement of the halogen atom by the residue of the arylamine is substantially completely effected and undesirable side reactions forming impurities which are difficult to remove from the desired product are avoided. To this end it has previously been suggested to aid the course of the reaction, while preventing in some measure the occurrence of side reactions, by the use of agents which remove from the zone of reaction the halogen acid released; i. e., agents which are termed "acid binding agents." Amination catalysts such as, for example, finely divided copper and copper salts, are also usually employed in these reactions.

In attempting to devise a commercially feasible method for the preparation of arylaminoanthraquinone compounds of any particular type, however, it is usually found that the methods which have been used for the preparation of other arylaminoanthraquinone compounds are not satisfactory; such methods often resulting in products contaminated with impurities and obtainable only in low yields. Also, when attempting to use a method satisfactory for the preparation of arylaminoanthraquinone compounds of one type for the preparation of arylaminoanthraquinone compounds of another type, it is usually found that even moderately efficient results may be obtained only with the used of a large excess of the arylamine, an obvious waste.

As indicated above, the present invention is concerned with a process in which an alphahalogen substitute anthraquinone compound, free from acid solubilizing groups (such as carboxylic and sulfonic acid groups and their functional derivatives, such as esters and amides) is condensed with an arylamine likewise free from such groups. For purposes of clarity of langauge, the expression "free from acid solubilizing groups" will be employed in this specification and in the claims to mean not only freedom from acid solubilizing groups themselves, but also freedom from their functional derivatives.

It has been discovered in accordance with the present invention that an alpha-halogen substituted anthraquinone compound which is free from acid solubilizing groups can be reacted with an arylamine which is likewise free from such groups, to produce an arylaminoanthraquinone condensation product in excellent yields and of high purity by carrying out the condensation reaction in the presence of a butyl alcohol as a solvent medium and potassium acetate as the acid binding agent.

An arylaminoanthraquinone compound may advantageously be prepared in accordance with one embodiment of the present invention by heating to an elevated temperature a mixture comprising an alpha-halogen substituted anthraquinone compound and an arylamine (both of which are free from acid solubilizing groups), a quantity of normal primary butyl alcohol sufficient to act as a solvent medium for the reaction, and a proportion of potassium acetate sufficient in amount to absorb the acid released in the condensation reaction. There is also incorporated in the mixture a small amount of an amination catalyst such as, for example, cuprous chloride, copper acetate, copper carbonate, or copper bronze. The mixture is preferably heated to temperatures above 100° C.; this procedure in accordance with the preferred practice being carried out by boiling the mixture under reflux at atmospheric pressure. The heating is continued until the condensation reaction is completed which, under the usual conditions, will take from about five to about ten hours. After completion of the condensation reaction, the reaction mixture is permitted to cool to a normal atmospheric temperature; e. g., to between about 20° and 30° C., and the arylaminoanthraquinone condensation product, which is generally substantially insoluble in the solvent medium, is separated from the remainder of the mixture, as by filtration. The thus obtained arylaminoanthraquinone compound is then preferably washed with one or more suitable solvents, such as a butyl alcohol, ethyl alcohol, and water, and dried. If a highly purified product is desired, the arylaminoanthraquinone compound may be further purified by recrystallization from a solvent such as, for example, dichlorbenzene.

It has been found to be important in carrying out the above condensation reaction to control the amount of water present in the mixture. The presence of a small quantity of water in the mixture may be tolerated without reducing materially the yields obtainable. But if the quantity of water is increased, there is a corresponding decrease in the yield of the desired product. Consequently, it is preferred to carry out the reaction under substantially anhydrous conditions and the upper limit of the water content of the reaction mixture preferably should not exceed 15 per cent based on the weight of the mixture. Hence the materials; e. g., the potassium acetate, used in this reaction are preferably employed in the anhydrous condition.

In the usual case the present process is employed for effecting the condensation between an alpha-halogen substituted anthraquinone compound and an arylamine in which the residue of the amine replaces only one halogen atom in the alpha-position on the anthraquinone nucleus. However, if the anthraquinone compound used as the starting material contains two or more alpha-halogen atoms, the process may be carried out so as to replace more than one of the alpha-halogen atoms with the residue of the arylamine. In this case the amount of the arylamine used will be varied depending upon the number of halogen atoms it is desired to replace in the anthraquinone compound.

As already stated, the present process is characterized by the excellent yields and high purity of the arylamino-anthraquinone compounds obtained. The process is further characterized by the fact that it may be carried out efficiently without the use of a large excess of the arylamine such as is frequently required in other processes for reasonably efficient results. For example, a good yield of the desired arylamino-anthraquinone compound may be obtained in the present process by reacting an alpha-halogen substituted anthraquinone compound with an arylamine in such proportions that only a slight excess of the amine over that theoretically requisite to replace the halogen is present in the reaction mixture. For best results, however, it is preferable to use not appreciably less than 1.5 mols of the arylamine for each mol equivalent of the halogen substituted anthraquinone compound. The term "mol equivalent" is used herein with reference to the amount of alpha-halogen substituted anthraquinone compound employed in the condensation to indicate that this amount is dependent upon the number of replaceable alpha-halogen atoms in the compound. For example, where the halogen anthraquinone compound contains one replaceable alpha-halogen atom, one mol equivalent is equal to one mol of the halogen anthraquinone compound whereas one mol equivalent of the halogen anthraquinone compound containing two replaceable alpha-halogen atoms is equal to one-half mol of the compound. In the ordinary case, from about 1.5 to about 2 mols of the arylamine to each mol equivalent of the halogen substituted anthraquinone compound is a suitable proportion. While larger amounts of the arylamine are not prejudicial to the success of the reaction, the present process makes their use unnecessary.

Although it is not intended that the invention should be limited by any theoretical explanation, it appears probable that the improved results obtainable by practice of the present invention are due in some measure at least to the facts that the potassium acetate and arylamine are relatively soluble in the butyl alcohols, and these alcohols have boiling points such that when the reaction is carried out by boiling under reflux, the temperature is that at which the reaction proceeds in an efficient manner. Further, the arylaminoanthraquinone condensation products formed in the reaction are generally substantially insoluble in the butyl alcohols, and consequently may be effectively recovered therefrom, as by filtration, relatively free of impurities. The butyl alcohols have the further advantage that they may be easily handled in commercial operations, and after use may be efficiently recovered by distillation.

As indicated, the present process is valuable for the preparation of arylaminoanthraquinone using as the starting materials alpha-halogen substituted anthraquinone free from acid solubilizing groups. These compounds may be free of substituents other than the alpha-halogen atoms or may contain substituents such as, for example, halogen and amino, hydroxyl, alkyl, aryl, aralkyl, alkaryl, and alkoxy groups in other positions in the anthraquinone nucleus. The process is of particular value when the starting material is an alpha-halogen substituted anthraquinone which contains an amino group as a substituent, especially in the para-position to the halogen atom. The compounds of this latter type may be free from other substituents or may contain additional substituents, especially in the position ortho to the amino group. These compounds may be represented by the following general formula:

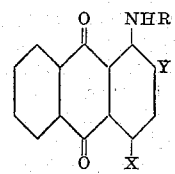

wherein R represents a hydrogen atom or an alkyl, aryl, alkaryl, or aralkyl group; Y represents a halogen or a hydroxyl, alkyl, alkoxy, alkaryl, aralkyl, aryloxy, aryl, amino, alkylamino, or arylamino group; and X represents a halogen atom. It will be understood that compounds of this type may contain additional substituents. For example, compounds of this type which contain a hydroxyl, amino, alkylamino, arylamino, an alkyl, aryl, alkaryl, or aralkyl group in an alpha-position or a halogen or alkyl, alkoxy, hydroxy, aryl, alkaryl, aralkyl, amino, alkylamino, arylamino group in a beta-position in the anthraquinone nucleus may be employed as starting materials in the present process.

It will of course be apparent that there are a large number of specific alpha-halogen substituted anthraquinone compounds which may be employed as starting materials in the process of the present invention. As examples of such anthraquinone compounds may be mentioned the following: 1-amino-2,4-dibromanthraquinone, 1- brom-2-amino-3-chloranthraquinone, 1-amino-2-methyl-4-bromanthraquinone, 1-methylamino-4-bromanthraquinone, 1,5-dichloranthraquinone, 1-amino-2-hydroxy-4-bromanthraquinone, 1,5-diamino-2,4,6,8-tetrabromanthraquinone, 1-amino-2-methoxy-4-bromanthraquinone, 1-phenylamino-2,4-dibromanthraquinone, 1-benzylamino-2,4-dibromanthraquinone, 1-amino-2,4-dibrom-6-chloranthraquinone, and 1-chlor-2-methylanthraquinone.

The arylamines which may be condensed with anthraquinone compounds of the above type may likewise be of varied character, provided they are free from acid-solubilizing groups. The arylamines of the benzene and naphthalene series are of particular value in this connection. Thus there may be employed for this condensation para-toluidine, ortho-toluidine, meta-toluidine, para-anisidine, ortho-anisidine, meta-anisidine, benzidine, anilin, 4-chlor-ortho-anisidine, beta-naphthylamine, alpha-naphthylamine, etc. Products of particular importance are obtained by condensing 1-amino-2,4-dibromanthraquinone with any of the above mentioned arylamines, particularly the arylamines of the benzene series, and especially para-toluidine. Some of the compounds herein disclosed are new products as will be evident to those skilled in the art.

In order that the invention may be more fully understood, reference should be had to the following examples in which are described typical processes coming within the scope of the present invention. The parts are by weight and the temperatures in degrees centigrade.

*Example 1.*—A mixture of 50 parts of 1-amino-2,4-dibromanthraquinone, 40 parts of para-toluidine, 20 parts of potassium acetate, and 0.25 part of basic copper acetate in 150 parts of normal primary butyl alcohol is boiled gently at atmospheric pressure under refluxing conditions for about 5 to about 6 hours. The slurry is allowed to cool, and 1-amino-2-brom-4-para-toluidino-anthraquinone, which is substantially insoluble in the solvent, is isolated by filtration as the cake. It is washed with alcohol, followed by hot water in order to remove the inorganic salts, and then dried. An excellent yield of 1-amino-2-brom-4-para-toluidino-anthraquinone of satisfactory purity is obtained.

*Example 2.*—A mixture of 50 parts of 1-amino-2,4-dibromanthraquinone, 40 parts of para-toluidine, 20 parts of anhydrous potassium acetate, 0.5 part of copper acetate and 150 parts of isobutyl alcohol is agitated and boiled under reflux for 6 hours. The mixture is then cooled to 30° and filtered and the product is washed and recovered as in Example 1. A good yield of 1-amino-2-bromo-4-para-toluidinoanthraquinone of satisfactory purity is obtained.

*Example 3.*—200 parts of 1-amino-2,4-dibromanthraquinone are condensed with 160 parts of para-anisidine in the presence of 80 parts of anhydrous potassium acetate, 1 part of cuprous chloride, and 550 parts of normal primary butyl alcohol. The mixture is boiled under reflux for about 8 hours. The product is isolated by filtration as in Example 1. It may be recrystallized from dichlorbenzene, washed with alcohol and hot water, and then dried. A good yield of 1-amino-2-bromo-4-para-anisidinoanthraquinone of satisfactory purity is obtained.

*Example 4.*—50 parts of 1-amino-2-methyl-4-bromanthraquinone are condensed with 40 parts of para-toluidine in the presence of 20 parts of anhydrous potassium acetate and 0.25 part of copper acetate, in 140 parts of normal primary butyl alcohol by boiling the mixture for about 6 hours under reflux. The product is isolated and worked up as in Example 1. The product is 1-amino-2-methyl-4-para-toluidinoanthraquinone.

*Example 5.*—A mixture of 100 parts of 1-amino-2,4-dibromanthraquinone with 80 parts of beta-naphthylamine, 40 parts of anhydrous potassium acetate, and 0.5 parts of cuprous chloride, in 300 parts of normal primary butyl alcohol is boiled under reflux for 7 hours. The product is isolated and worked up as in Example 1. A good yield of 1-amino-2-brom-4-beta-naphthylaminoanthraquinone is obtained.

*Example 6.*—40 parts of 1-amino-2-methyl-4-brom-anthraquinone are condensed with 25 parts of para-anisidine in the presence of 15 parts of anhydrous potassium acetate and 0.5 part of copper acetate, in 200 parts of normal primary butyl alcohol, by boiling under reflux for about 6 hours. After allowing the reaction mixture to cool, 1-amino-2-methyl-4-para-anisidinoanthraquinone is filtered out as the cake, washed successively with butyl alcohol, ethyl alcohol, and hot water, and finally dried.

*Example 7.*—25 parts of a technical grade of 1,5-dichloranthraquinone is condensed with 40 parts of para-toluidine in the presence of 0.6 part of cuprous chloride and 20 parts of anhydrous acetate, in 150 parts of normal primary butyl alcohol, by heating the mixture to boiling under reflux for about 8 hours. The reaction mixture is cooled to about 30°. The condensation product, which is substantially insoluble in the solvent, is separated by filtration as the cake, washed successively with a butyl alcohol, ethyl alcohol, and hot water, and finally dried. A good yield of 1,5-di-para-toluidinoanthraquinone of good quality is obtained.

1,5-dichloranthraquinone may be condensed with two molecules of benzidine in like manner. The resulting product is preferably recrystallized from a suitable solvent such as dichlorbenzene.

*Example 8.*—50 parts of 1-brom-2-amino-3-chloranthraquinone are condensed with 40 parts of para-anisidine in the presence of 0.2 part of cuprous chloride and 20 parts of anhydrous potassium acetate, in 300 parts of normal primary butyl alcohol by boiling the mixture under reflux for 9 hours. The product is isolated and worked up in the same manner as the product of Example 7. An excellent yield of 1-para-anisidino-2-amino-3-chloranthraquinone is obtained.

*Example 9.*—A mixture of 50 parts of 1-chloro-2-methylanthraquinone, 35 parts of anilin, 0.5 part of cuprous chloride, 18 parts of anhydrous potassium acetate, and 150 parts of normal primary butyl alcohol is agitated and boiled under reflux for 7 hours. After cooling, the product, 1-phenylamino-2-methylanthraquinone, in crystalline form is filtered out, washed with normal primary butyl alcohol and then with ethyl alcohol. The filter cake is slurried with dilute hydrochloric acid, refiltered, washed, and dried. A good yield of 1-phenylamino-2-methylanthraquinone of satisfactory purity is obtained.

The processes described in the preceding examples are susceptible of wide variation within the scope of the present invention. To produce arylaminoanthraquinone condensation products of varying types, there may be employed in place of the alpha-halogen substituted anthraquinone compounds used as starting materials in the processes described in the examples, other alpha-halogen substituted anthraquinone compounds which may or may not contain other substituents, but which, as before indicated, preferably contain an amino group as an additional substituent, especially in the para-position to the halogen atom. Also, other arylaminoanthraquinone condensation products may be prepared by using in place of the arylamines employed in the examples other arylamines such as, for example, those previously mentioned.

While the processes described in the examples, being representative of preferred practice, are carried out under substantially anhydrous conditions, satisfactory results may be obtained when the reaction mixture contains a small quantity of water. However, as previously indicated, any substantial increase in the amount of water in the reaction mixture results in a corresponding decrease in the yields of the desired arylaminoanthraquinone compounds.

The amount of potassium acetate, preferably anhydrous potassium acetate, employed in carrying out the process of the present invention may be varied widely, but it has been found that the reaction proceeds in optimum manner when from about 1.1 to about 2 mols of anhydrous potassium acetate are employed for each mol equivalent of the alpha-halogen substituted anthraquinone compound used. The amination catalyst, which as noted above may be, for example, copper acetate, cuprous chloride, copper carbonate, copper bronze, etc., may likewise be used in varying amounts. In general, amounts of the catalyst varying from about 0.005 part by weight to about 0.025 part by weight for each part by weight of the alpha-halogen substituted anthraquinone compound are satisfactory.

Although any butyl alcohol, such as, for example, normal primary butyl alcohol, isobutyl alcohol, secondary butyl alcohol, or mixtures of isomeric butyl alcohols, may be employed as the solvent medium in accordance with the present invention, it is preferred to use normal primary butyl alcohol or isobutyl alcohol. Best results are obtained when from about 2.5 to about 5 parts by weight of the butyl alcohol are used for each part by weight of the alpha-halogen substituted anthraquinone compound used as the starting material.

From the foregoing description it will be apparent the present invention provides a novel and efficient process for the preparation of arylaminoanthraquinone compounds. The compounds are valuable products which, on being sulfonated, yield acid dyes that are especially useful for dyeing wool.

Since certain changes may be made in the process above described without departing from the scope of the invention, it is intended that all matter contained in the description shall be interpreted as illustrative and not in a limiting sense.

I claim:

1. In the process for the production of arylaminoanthraquinone compounds wherein an alpha-halogen substituted anthraquinone compound free from acid solubilizing groups is condensed with an arylamine likewise free from such groups, the improvement which comprises carrying out the condensation in the presence of a butyl alcohol as solvent medium and potassium acetate as acid binding agent.

2. In the process for the production of arylaminoanthraquinone compounds wherein an alpha-halogen substituted anthraquinone compound free from acid solubilizing groups is condensed with an arylamine likewise free from such groups, the improvement which comprises carrying out the condensation in the presence of normal primary butyl alcohol as solvent medium and potassium acetate as acid binding agent.

3. In the process for the production of arylaminoanthraquinone compounds wherein an alpha-halogen substituted anthraquinone compound free from acid solubilizing groups is condensed with an arylamine likewise free from such groups, the improvement which comprises carrying out the condensation in the presence of isobutyl alcohol as solvent medium and potassium acetate as acid binding agent.

4. In the process for the production of arylaminoanthraquinone compounds wherein an alpha-halogen substituted anthraquinone compound free from acid solubilizing groups is condensed with an arylamine likewise free from such groups, and selected from the arylamines of the benzene and naphthalene series, the improvement which comprises carrying out the condensation under substantially anhydrous conditions in the presence of a butyl alcohol as solvent medium and anhydrous potassium acetate as acid binding agent, the amount of butyl alcohol being at least 2.5 times the amount of alpha-halogen substituted anthraquinone compound by weight.

5. In the process for the production of arylaminoanthraquinone compounds wherein an alpha-halogen substituted anthraquinone compound free from acid solubilizing groups is condensed with an arylamine likewise free from such groups, the improvement which comprises carrying out the condensation under substantially anhydrous conditions in the presence of normal butyl alcohol as solvent medium and anhydrous potassium acetate as acid binding agent, the amount of butyl alcohol being at least 2.5 times the amount of alpha-halogen substituted anthraquinone compound by weight.

6. In the process for the preparation of arylaminoanthraquinone compounds wherein an alpha-halogen substituted anthraquinone compound free from acid solubilizing groups is condensed with an arylamine likewise free from such groups, the improvement which comprises carrying out the condensation in a reaction medium comprising a butyl alcohol, potassium acetate, and an amination catalyst, the amount of butyl alcohol being at least 2.5 times the amount of alpha-halogen substituted anthraquinone compound by weight.

7. In the process for the preparation of arylaminoanthraquinone compounds wherein an alpha-halogen substituted anthraquinone compound free from acid solubilizing groups is condensed with an arylamine likewise free from such groups, the improvement which comprises carrying out the condensation under substantially anhydrous conditions in a reaction medium comprising a butyl alcohol, anhydrous potassium acetate, and an amination catalyst, the amount of butyl alcohol being at least 2.5 times the amount of alpha-halogen substituted anthraquinone compound by weight.

8. In the process for the preparation of arylaminoanthraquinone compounds wherein an alpha-halogen substituted anthraquinone compound, free from acid solubilizing groups and containing an amino group, is condensed with an arylamine likewise free from acid solubilizing groups, and selected from the group consisting of the arylamines of the benzene and naphthalene series, the improvement which comprises carrying out the condensation under substantially anhydrous conditions in a reaction medium comprising normal primary butyl alcohol, anhydrous potassium acetate, and an amination catalyst.

9. In the process for the preparation of arylaminoanthraquinone compounds wherein an alpha-halogen substituted anthraquinone compound, free from acid solubilizing groups and containing an amino group in the para-position to the alpha-halogen atom, is condensed with an arylamine likewise free from acid solubilizing groups, and selected from the group consisting of the arylamines of the benzene and naphthalene series, the improvement which comprises carrying out the condensation under substantially anhydrous conditions in a reaction medium comprising normal primary butyl alcohol, anhydrous potassium acetate, and an amination catalyst.

10. In the process for the preparation of arylaminoanthraquinone compounds wherein an alpha-halogen substituted anthraquinone compound free from acid solubilizing groups is condensed with an arylamine likewise free from such groups, the improvement which comprises maintaining at a reaction temperature a mixture comprising one mol equivalent of said alpha-halogen substituted anthraquinone compound and about 1.5 to 2 mols of said arylamine in a reaction medium comprising a butyl alcohol, potassium acetate, and an amination catalyst, until an arylaminoanthraquinone compound is formed.

11. In the process for the preparation of arylaminoanthraquinone compounds wherein an alpha-halogen substituted anthraquinone compound free from acid solubilizing groups is condensed with an arylamine likewise free from such groups, the improvement which comprises maintaining at a reaction temperature a mixture comprising one mol equivalent of said alpha-halogen substituted anthraquinone compound and about 1.5 to about 2 mols of said arylamine in a substantially anhydrous reaction medium comprising a butyl alcohol, anhydrous potassium acetate, and an amination catalyst, until an arylaminoanthraquinone compound is formed.

12. In the process for the preparation of arylaminoanthraquinone compounds wherein an alpha-halogen substituted anthraquinone compound free from acid solubilizing groups is condensed with an arylamine likewise free from such groups, the improvement which comprises maintaining at a reaction temperature above 100° C. a mixture comprising one mol equivalent of said alpha-halogen substituted anthraquinone compound and about 1.5 to about 2 mols of said arylamine in a substantailly anhydrous reaction medium comprising a butyl alcohol, anhydrous potassium acetate, and an amination catalyst, until an arylaminoanthraquinone compound is formed.

13. In the process for the preparation of arylaminoanthraquinone compounds wherein an alpha-halogen substituted anthraquinone compound free from acid solubilizing groups and containing an amino group in the para-position to the halogen atom is condensed with an arylamine likewise free from acid solubilizing groups, the improvement which comprises maintaining at a reaction temperature above 100° C. a mixture comprising one mol equivalent of said alpha-halogen substituted anthraquinone compound and about 1.5 to about 2 mols of said arylamine in a substantially anhydrous reaction medium comprising a butyl alcohol, anhydrous potassium acetate, and an amination catalyst, until an arylaminoanthraquinone is formed, cooling the reaction mixture to a normal atmospheric temperature, and separating the arylaminoanthraquinone compound from the remainder of the reaction mixture.

14. In the process for the preparation of arylaminoanthraquinone compounds wherein 1-amino-2,4-dibromanthraquinone is condensed with an arylamine free from acid solubilizing groups, the improvement which comprises maintaining at a reaction temperature above 100° C., a mixture comprising one mol equivalent of 1-amino-2,4-dibromanthraquinone and about 1.5 to about 2 mols of said arylamine in a substantially anhydrous reaction medium comprising a butyl alcohol, anhydrous potassium acetate, and an amination catalyst, until an arylaminoanthraquinone compound is formed.

15. In the process for the preparation of arylaminoanthraquinone compounds wherein 1-amino-2,4-dibromanthraquinone is condensed with an arylamine of the benzene series free from acid solubilizing groups, the improvement which comprises maintaining at a reaction temperature above 100° C., a mixture comprising one mol equivalent of 1-amino-2,4-dibromanthraquinone and about 1.5 to about 2 mols of said arylamine in a substantially anhydrous reaction medium comprising normal primary butyl alcohol, anhydrous potassium acetate, and an amination catalyst, until an arylaminoanthraquinone compound is formed, cooling the reaction mixture, and separating the arylaminoanthraquinone compound from the remainder of the reaction mixture.

16. In the process for the preparation of arylaminoanthraquinone compounds wherein an alpha-halogen substituted anthraquinone compound free from acid solubilizing groups is condensed with an arylamine likewise free from such groups, the improvement which comprises boiling under reflux a substantially anhydrous mixture containing one mol equivalent of said alpha-halogen substituted anthraquinone compound, about 1.5 to about 2 mols of said arylamine, about 1.1 to about 2 mols of anhydrous potassium acetate, about 2.5 to about 5 parts by weight of a butyl alcohol and about .005 to about .025 part by weight of an amination catalyst for each part by weight of the alpha-halogen substituted anthraquinone compound, continuing the boiling for about 5 to about 10 hours to form an arylaminoanthraquinone compound, cooling the mixture, and recovering the arylaminoanthraquinone compound from the remainder of the mixture.

17. In the process for the preparation of arylaminoanthraquinone compounds wherein an alpha-halogen substituted anthraquinone compound free from acid solubilizing groups is condensed with an arylamine likewise free from such groups and selected from the group consisting of the arylamines of the benzene and naphthalene series, the improvement which comprises boiling under reflux a substantially anhydrous mixture containing one mol equivalent of said alpha-halogen substituted anthraquinone compound, about 1.5 to about 2 mols of said arylamine, about 1.1 to about 2 mols of anhydrous potassium acetate, about 2.5 to about 5 parts by weight of normal butyl alcohol and about .005 to about .025 part by weight of an amination catalyst selected from the group consisting of copper acetate, cuprous chloride, copper carbonate and copper bronze for each part by weight of the alpha-halogen substituted anthraquinone compound, continuing the boiling for about 5 to about 10 hours to form an arylaminoanthraquinone compound, cooling the mixture, and recovering the arylaminoanthraquinone compound from the remainder of the mixture.

18. In the process for the preparation of 1-amino-2-brom-4-arylaminoanthraquinones wherein 1-amino-2,4-dibrom-anthraquinone is condensed with a primary arylamine of the benzene series free from acid solubilizing groups, the improvement which comprises carrying out the condensation under substantially anhydrous conditions in the presence of a butyl alcohol as solvent medium and anhydrous potassium acetate as acid binding agent.

19. In the process for the preparation of 1-amino-2-brom-4-para-toluidinoanthraquinone wherein 1-amino-2,4-dibrom-anthraquinone is condensed with p-toluidine, the improvement which comprises carrying out the condensation under substantially anhydrous conditions in the presence of a butyl alcohol as solvent medium and anhydrous potassium acetate as acid binding agent.

20. The process for the preparation of 1-amino-2-brom-4-para-toluidinoanthraquinone which comprises boiling under reflux a substantially anhydrous mixture containing 50 parts by weight of 1-amino, 2,4-dibromanthraquinone, 40 parts of para-toluidine, 20 parts of potassium acetate, .025 part of copper acetate and 150 parts of normal primary butyl alcohol for about 5 to about 6 hours, to form 1-amino-2-brom-4-para-toluidinoanthraquinone, permitting the mixture to cool to between about 20° and about 30° C., and recovering the 1-amino-2-brom-4-para-toluidinoanthraquinone by filtration from the remainder of the mixture.

RICHARD S. WILDER.

CERTIFICATE OF CORRECTION.

Patent No. 2,210,517.  August 6, 1940.

RICHARD S. WILDER.

It is hereby certified that error appears in the printed specification of the above numbered patent requiring correction as follows: Page 1, first column, line 8, after "likewise" insert the word --free--; and second column, line 4, for "used" read --use--; line 40, for "absorb" read --adsorb--; page 3, second column, line 9, for the word "parts" read --part--; line 29, after "anhydrous" insert --potassium--; page 5, first column, line 30, claim 10, after "to" insert --about--; line 59, claim 12, for "substantailly" read --substantially--; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.